(12) United States Patent
Zhou et al.

(10) Patent No.: US 12,248,617 B2
(45) Date of Patent: Mar. 11, 2025

(54) DEFENDING AGAINST ADVERSARIAL ATTACKS IN FEDERATED LEARNING

(71) Applicant: International Business Machines Corporation, Armonk, NY (US)

(72) Inventors: Yi Zhou, San Jose, CA (US); Kamala Micaela Noelle Varma, Minneapolis, MN (US); Nathalie Baracaldo Angel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 17/811,166

(22) Filed: Jul. 7, 2022

(65) Prior Publication Data

US 2024/0012942 A1    Jan. 11, 2024

(51) Int. Cl.
*G06F 21/64*        (2013.01)
*G06N 20/20*        (2019.01)

(52) U.S. Cl.
CPC ............. *G06F 21/64* (2013.01); *G06N 20/20* (2019.01)

(58) Field of Classification Search
CPC ................................. G06F 21/64; G06N 20/20
See application file for complete search history.

(56) References Cited

U.S. PATENT DOCUMENTS

| | | | |
|---|---|---|---|
| 2021/0051169 A1* | 2/2021 | Karame | G06N 20/00 |
| 2021/0089579 A1* | 3/2021 | Shu | H04L 51/02 |
| 2022/0108177 A1* | 4/2022 | Samek | G06N 3/045 |

FOREIGN PATENT DOCUMENTS

| | | |
|---|---|---|
| CN | 114091356 A | 2/2022 |
| WO | 2021008675 A1 | 1/2021 |

OTHER PUBLICATIONS

Bagdasaryan, et al., "How To Backdoor Federated Learning," arXiv:1807.00459v3 [cs.CR] Aug. 6, 2019, 15 pages.
Blanchard, et al., "Byzantine-Tolerant Machine Learning," arXiv:1703.02757v1 [cs.DC] Mar. 8, 2017, 16 pages.
Fang, et al., "Local Model Poisoning Attacks to Byzantine-Robust Federated Learning," in the Proceedings of the 29th USENIX Security Symposium, Aug. 12-14, 2020, 19 pages.
Jin, et al., "Stochastic-Sign SGD for Federated Learning with Theoretical Guarantees," arXiv:2002.10940v5 [cs.LG] Sep. 27, 2021, 35 pages.

(Continued)

*Primary Examiner* — Nicholas P Celani
(74) *Attorney, Agent, or Firm* — Stosch Sabo

(57) ABSTRACT

A computer-implemented method, a computer program product, and a computer system for defending against adversarial attacks in federated learning. In the federated learning comprising an aggregator and parties, the aggregator receives weights sent from the respective parties. The aggregator computes values of a performance metric for weight arrays obtained by the respective parties, using a validation dataset. The aggregator ranks the values of the performance metric in a list. The aggregator recursively splits the list in half until one or more adversary updates of the weights are isolated. The aggregator excludes one or more parties that send the one or more adversary updates from participating in a current round of training in the federated learning.

25 Claims, 10 Drawing Sheets

(56) References Cited

OTHER PUBLICATIONS

Mell et al., "The NIST Definition of Cloud Computing", NIST National Institute of Standards and Technology U.S. Department of Commerce, Special Publication 800-145, Sep. 2011, 7 pages.
Rieger, et al., "Client Adaptation improves Federated Learning with Simulated Non-IID Clients," arXiv:2007.04806v1 [cs.LG] Jul. 9, 2020, 11 pages.
Shejwalkar et al.,, "Manipulating the Byzantine: Optimizing Model Poisoning Attacks and Defenses for Federated Learning," Network and Distributed Systems Security (NDSS), 2021, 19 pages.
Tolpegin, et al., "Data Poisoning Attacks Against Federated Learning Systems," arXiv:2007.08432v2 [cs.LG] Aug. 11, 2020, 20 pages.
Varma, et al., "LEGATO: A LayerwisE Gradient AggregaTiOn Algorithm for Mitigating Byzantine Attacks in Federated Learning," arXiv:2107.12490v1 [cs.LG] Jul. 26, 2021, 10 pages.
Wu et al., "Mitigating Backdoor Attacks in Federated Learning," arXiv:2011.01767v2 [cs.CR] Jan. 14, 2021, 11 pages.
Xie, et al., "Fall of Empires: Breaking Byzantine-tolerant SGD by Inner Product Manipulation," arXiv:1903.03936v1 [cs.LG] Mar. 10, 2019, 10 pages.
Xie, et al., "Generalized Byzantine-Tolerant SGD," arXiv:1802.10116v3 [cs.DC] Mar. 23, 2018, 25 pages.
Xie, et al., "Zeno: Distributed Stochastic Gradient Descent with Suspicion-based Fault-tolerance," Proceedings of the 36th International Conference on Machine Learning, Long Beach, California, PMLR 97, 2019, 9 pages.
Yin, et al., "Byzantine-Robust Distributed Learning: Towards Optimal Statistical Rates," arXiv:1803.01498v2 [cs.LG] Feb. 25, 2021, 33 pages.
Zhu et al., "MANDERA: Malicious Node Detection in Federated Learning via Ranking," arXiv:2110.1173v1 [cs.LG] Oct. 22, 2021, 14 pages.
Zhao et al: "FederatedReverse: A Detection and Defense Method Against Backdoor Attacks in Federated Learning", Proceedings of the 2023 Conference on Human Information Interaction and Retrieval, ACMPUB27, Jun. 17, 2021 (Jun. 17, 2021), pp. 51-62, New York, NY, USA.
Notification of Transmittal of the International Search Report and the Written Opinion of the International Searching Authority, or the Declaration for Application PCT/EP2023/066459, Sep. 29, 2023, 11 pages.
Roux et al., "A Comparative Study of Divisive and Agglomerative Hierarchical Clustering Algorithms", Journal of Classification, Springer, Aug. 7, 2018 (Aug. 7, 2018), pp. 345-366, vol. 35, No. 2, Berlin, DE.
Sattler et al., "Clustered Federated Learning: Model-Agnostic Distributed Multitask Optimization Under Privacy Constraints," IEEE Transactions on Neural Networks and Learning Systems, IEEE, Aug. 24, 2020, pp. 3710-3722, vol. 32, No. 8.

\* cited by examiner

DEFENDING AGAINST ADVERSARIAL ATTACKS IN FEDERATED LEARNING

BACKGROUND

The present invention relates generally to federated learning, and more particularly to defending against adversarial attacks in federated learning.

Federated learning, since its inception, has attracted considerable attention. The goal of federated learning is to collaboratively train machine learning models without sharing or revealing training data. In federated learning, an aggregator monitors a federated learning process. The aggregator issues a query to parties (or participants) to learn a global model. The parties train the global model using their local databases and send responses to the aggregator. The aggregator collects the responses from the parties and updates the global model.

In federated learning, adversarial attacks may occur. A party or a group of parties may send back a meaningless reply or meaningless replies that may lead to poor performance of federated learning. Due to glitches or communication failure, a reply from a party or replies from a group of parties may be corrupted and may lead to poor performance of federated learning. In a case that a dataset of a party or datasets of multiple parties are corrupted, replies sent from the party or parties may lead to poor model performance (a backdoored model).

There exist some methods for defending against adversarial attacks in federated learning. The ways of defending against adversarial attacks may be eliminating adverse updates and mitigating adverse effects. However, there doesn't exist any defense that can achieve good model performance under any type of attacks in general.

SUMMARY

In one aspect, a computer-implemented method for defending against adversarial attacks in federated learning is provided. The computer-implemented method includes receiving, by an aggregator in the federated learning, weights sent from respective parties in the federated learning. The computer-implemented method further includes computing, by the aggregator, values of a performance metric for weight arrays obtained by the respective parties, using a validation dataset. The computer-implemented method further includes ranking, by the aggregator, the values of the performance metric in a list. The computer-implemented method further includes recursively splitting, by the aggregator, the list in half until one or more adversary updates of the weights are isolated. The computer-implemented method further includes excluding, by the aggregator, one or more parties that send the one or more adversary updates from participating in a current round of training in the federated learning.

In another aspect, a computer program product for defending against adversarial attacks in federated learning is provided. The computer program product comprises a computer readable storage medium having program instructions embodied therewith, and the program instructions are executable by one or more processors. The program instructions are executable to: receive, by an aggregator in the federated learning, weights sent from respective parties in the federated learning; compute, by the aggregator, values of a performance metric for weight arrays obtained by the respective parties, using a validation dataset; rank, by the aggregator, the values of the performance metric in a list; recursively split, by the aggregator, the list in half until one or more adversary updates of the weights are isolated; and exclude, by the aggregator, one or more parties that send the one or more adversary updates from participating in a current round of training in the federated learning.

In yet another aspect, a computer system for defending against adversarial attacks in federated learning is provided. The computer system comprises one or more processors, one or more computer readable tangible storage devices, and program instructions stored on at least one of the one or more computer readable tangible storage devices for execution by at least one of the one or more processors. The program instructions are executable to receive, by an aggregator in the federated learning, weights sent from respective parties in the federated learning. The program instructions are further executable to compute, by the aggregator, values of a performance metric for weight arrays obtained by the respective parties, using a validation dataset. The program instructions are further executable to rank, by the aggregator, the values of the performance metric in a list. The program instructions are further executable to recursively split, by the aggregator, the list in half until one or more adversary updates of the weights are isolated. The program instructions are further executable to exclude, by the aggregator, one or more parties that send the one or more adversary updates from participating in a current round of training in the federated learning.

In yet another aspect, a computer-implemented method for defending against adversarial attacks in federated learning is provided. The computer-implemented method includes receiving, by an aggregator in the federated learning, weights sent from respective parties in the federated learning. The computer-implemented method further includes computing, by the aggregator, values of loss for weight arrays obtained by the respective parties, using a validation dataset. The computer-implemented method further includes ranking, by the aggregator, the values of the loss in a list. The computer-implemented method further includes recursively splitting, by the aggregator, the list in half until one or more adversary updates of the weights are isolated. The computer-implemented method further includes excluding, by the aggregator, one or more parties that send the one or more adversary updates from participating in a current round of training in the federated learning.

In yet another aspect, a computer-implemented method for defending against adversarial attacks in federated learning is provided. The computer-implemented method includes: receiving, by an aggregator in the federated learning, weights sent from respective parties in the federated learning; computing, by the aggregator, values of accuracy for weight arrays obtained by the respective parties, using a validation dataset; ranking, by the aggregator, the values of the accuracy in a list; recursively splitting, by the aggregator, the list in half until one or more adversary updates of the weights are isolated; and excluding, by the aggregator, one or more parties that send the one or more adversary updates from participating in a current round of training in the federated learning.

DETAILED DESCRIPTION

Figure 1:
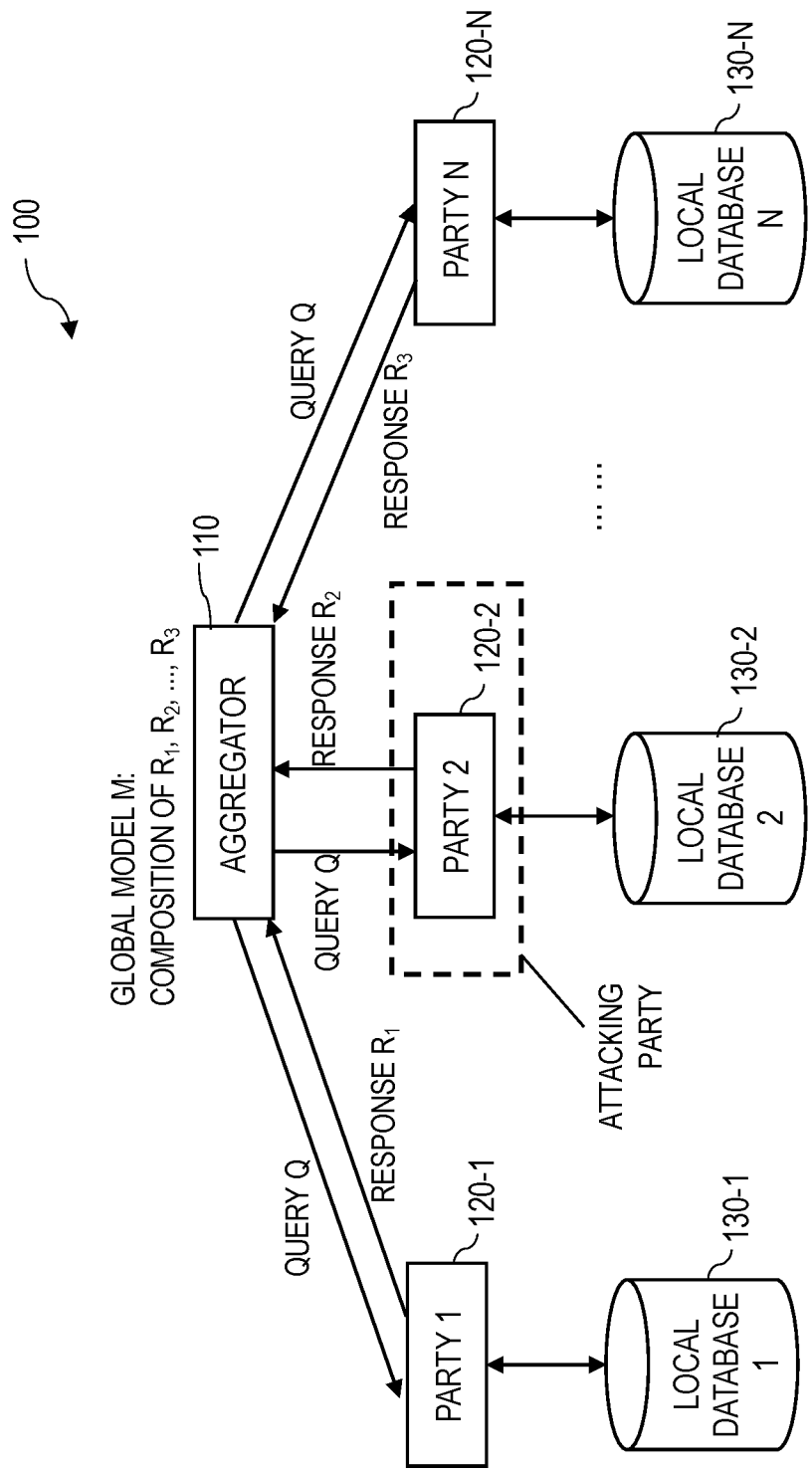
FIG. 1 illustrates a system of federated learning, in accordance with one embodiment of the present invention.

FIG. 1 illustrates system 100 of federated learning, in accordance with one embodiment of the present invention. System 100 includes aggregator 110 and N parties or participants, namely party 1 120-1, party 2 120-2, ..., and party N 120-N. Each of the N parties has its own local databases; in other words, party 1 120-1 has local database 1 130-1, party 2 120-2 has local database 2 130-2, ..., and party N 120-N has local database 130-N. In system 100, aggregator 110 monitors a federated learning process. As shown in FIG. 1, aggregator 110 issues a query Q to N parties (party 1 120-1, party 2 120-2, ..., and party N 120-N). The query Q is a query to learn a global predictive model M. In the query Q, the current weights (model parameters) are given, gradients or new model parameters from N parties are asked, or information about a specific label (class) such as counts is asked for tree-based models. The N parties (party 1 120-1, party 2 120-2, ..., and party N 120-N) train the local predictive models $m_1, m_2, \ldots, m_N$ using local databases (database 1 130-1, database 2 130-2, ..., and local database 130-N), respectively. The N parties (party 1 120-1, party 2 120-2, ..., and party N 120-N) send responses (response $R_1$, response $R_2$, ..., and response $R_3$) to aggregator 110. Based on the responses (response $R_1$, response $R_2$, ..., and response $R_3$), aggregator 110 updates the global predictive model M.

Aggregator 110 may reside on a computing device or server. N parties (party 1 120-1, party 2 120-2, ..., and party N 120-N) may reside on respective ones of computing devices; for example, the parties may be edge and mobile devices. A computing device or server may be any electronic device or computing system capable of receiving input from a user, executing computer program instructions, and communicating with another computing system via a network. A computing device or server hosting aggregator 110 or a respective one of party 1 120-1, party 2 120-2, ..., and party N 120-N is described in more detail in later paragraphs with reference to FIG. 6.

System 100 may be implemented in a network that can be any combination of connections and protocols which support communications between aggregator 110 and N parties (party 1 120-1, party 2 120-2, ..., and party N 120-N). For example, the network may be the Internet which represents a worldwide collection of networks and gateways to support communications between devices connected to the Internet; the network may be implemented as an intranet, a local area network (LAN), a wide area network (WAN), and a wireless network. System 100 may be implemented in a cloud environment. The cloud environment is described in later paragraphs with reference to FIG. 7 and FIG. 8.

In federated learning, one or more adversary attacks may exist. One or more of the N parties may be attacking parties to federated learning. One or more attacking parties may send back meaningless responses that lead to poor performance of updating the global predictive model M. Responses from one or more attacking parties may be corrupted due to glitches or communication failure, which also lead to poor performance of updating the global predictive model M. The one or more adversary attacks may also due to situations in which training datasets in local databases of one or more attacking parties are corrupted; replies sent from such parties also lead to poor performance of updating the global predictive model M. As illustrated in FIG. 1, party 2 120-2 is an attacking party.

Figure 2:
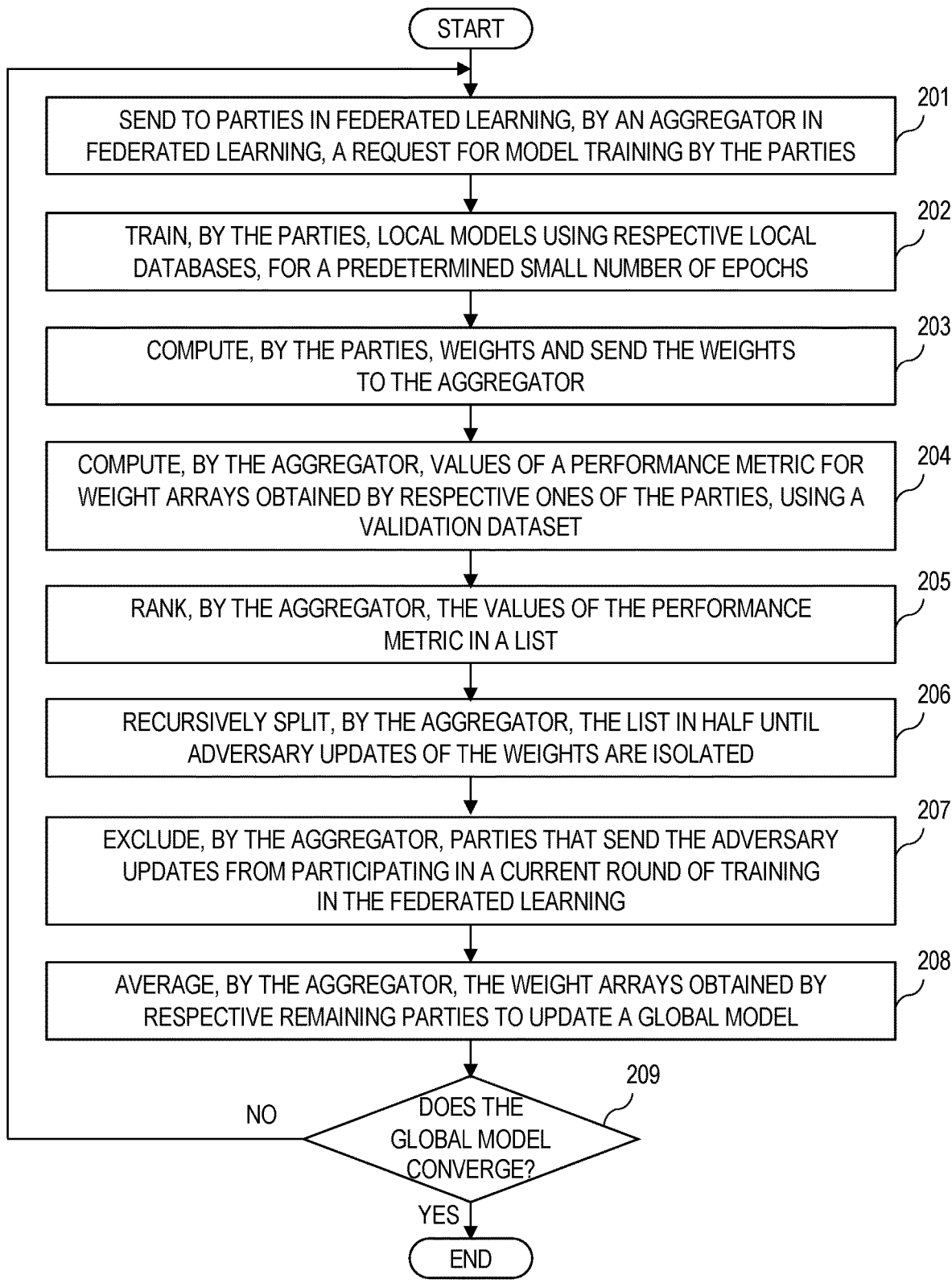
FIG. 2 is a flowchart showing operational steps of defending against adversarial attacks in federated learning, in accordance with one embodiment of the present invention.

FIG. 2 is a flowchart showing operational steps of defending against adversarial attacks in federated learning, in accordance with one embodiment of the present invention. At step 201, an aggregator in federated learning sends to parties in the federated learning a request for model training by the parties. In the embodiment shown in FIG. 1, aggregator 110 sends a request for model training to party 1 120-1, party 2 120-2, ..., and party N 120-N. At step 202, the parties train local models using respective local databases, for a predetermined small number of epochs. In the embodiment shown in FIG. 1, party 1 120-1, party 2 120-2, ..., and party N 120-N train the local models, using database 1 130-1, database 2 130-2, ..., and local database 130-N, respectively. At step 203, the parties compute weights and send the weights to the aggregator. In the embodiment shown in FIG. 1, party 1 120-1, party 2 120-2, ..., and party N 120-N compute weights and send the weights to aggregator 110.

At step 204, the aggregator computes values of a performance metric for weight arrays obtained by respective ones of the parties, using a validation dataset. Upon receiving the weights sent from the respective ones of the parties, the aggregator computes the values of the performance metric. For example, in one embodiment, the performance metric may be loss; in another embodiment, the performance metric may be accuracy (e.g., F1 scores). The weight arrays are obtained by the respective ones of the parties at step 202 and step 203. In the embodiment shown in FIG. 1, aggregator 110 computes the values of the performance metric (either the loss or the accuracy) for the weight arrays obtained by party 1 120-1, party 2 120-2, ..., and party N 120-N.

Figure 4:
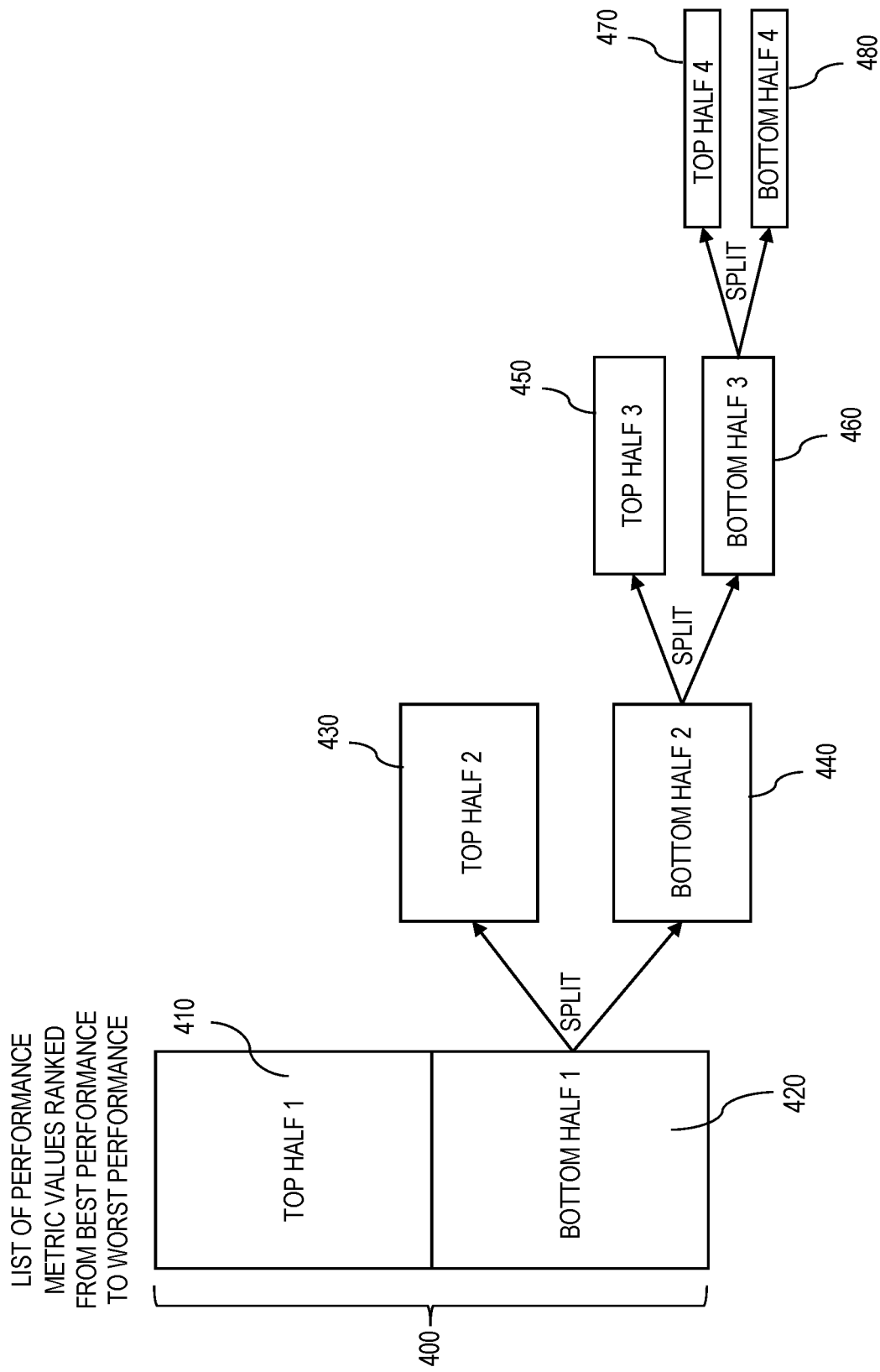
FIG. 4 illustrates recursively splitting a list which ranks values of a performance metric, in accordance with one embodiment of the present invention.

At step 205, the aggregator ranks the values of the performance metric in a list. For example, the values of the performance metric are ranked in a list with an order from best performance to worst performance. When the loss is used as the performance metric, the list is with an order from a lowest loss value to a highest loss value. When the accuracy is used as the performance metric, the list is with an order from a highest accuracy score to a lowest accurate score. For example, as illustrated in FIG. 4, list 400 includes the values of the performance metric and the values are ranked from best performance (e.g., lowest loss value or highest accuracy value) on the top of the list to worst performance (e.g., the highest loss value or lowest accuracy value) on the bottom. In the embodiment shown in FIG. 1, aggregator 110 aggregator ranks the values of the performance metric in the list.

At step 206, the aggregator recursively splits the list in half until adversary updates of the weights are isolated. In the embodiment shown in FIG. 1, aggregator 110 recursively splits the list in half. A process of recursively splitting the list will be described in detail in later paragraphs with reference to FIG. 3 and FIG. 4.

At step 207, the aggregator excludes one or more parties that send the adversary updates from participating in a current round of training in the federated learning. During the process of recursively splitting at step 206, parties sending the adversary updates are identified as attacking parties. The adversary updates sent from one or more attacking parties will not be used to update a global model at the current round of training. However, updates sent from remaining parties are honest updates and will be used to update the global model at the current round of training. At every round of training, the adversary updates need to be isolated. Not all attacking or malicious parties attack at each round of training. If a party sends an adversary update at a certain round of training, the party will be excluded at this round of training. If the same party sends another adversary update at a next round, it will still be excluded at the next round; however, if the same party does not send any adversary update at the next round, it will not be excluded at the next round of training. In the embodiment shown in FIG. 1, aggregator 110 identifies party 2 120-2 as an attacking party, and an adversary update sent by party 2 120-2 will not be used to update the global model. Party 2 120-2 will be excluded from participating in the current round of training. Party 1 120-1 and party N 120-N are identified as non-attacking party, and honest updates sent by party 1 120-1 and party N 120-N will be used to update the global model.

At step 208, the aggregator averages the weight arrays obtained by respective remaining parties to update a global model. In the embodiment shown in FIG. 1, aggregator 110 averages the weight arrays obtained by remaining parties such as party 1 120-1 and party N 120-N.

At step 209, the aggregator determines whether the global model converges. In response to determining that the global model does not converge (NO branch of step 209), the aggregator iterates from step 201 to step 209, until the global model converges. In response to determining the global model converges (YES branch of step 209), the process of federated learning is completed. In the process of federated learning, the aggregator defends against adversarial attacks in federated learning, and adversarial attacks are prevented through isolating the adversary updates in a process of recursively splitting.

Figure 3:
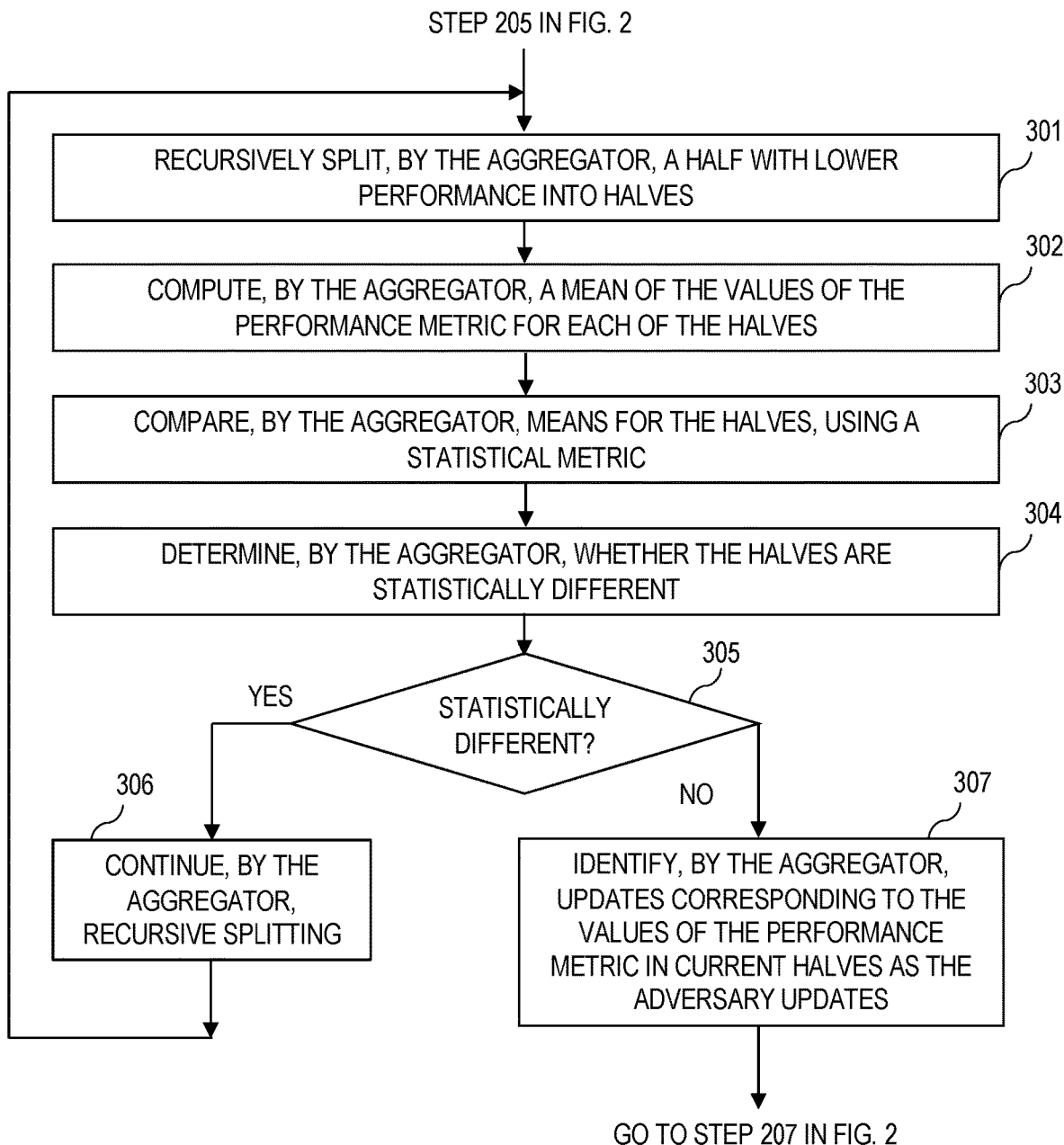
FIG. 3 is a flowchart showing operational steps of recursively splitting a list which ranks values of a performance metric, in accordance with one embodiment of the present invention.

FIG. 3 is a flowchart showing operational steps of recursively splitting a list which ranks values of a performance metric, in accordance with one embodiment of the present invention. In FIG. 3, step 206 in FIG. 2 is described in detail.

At step 301, the aggregator recursively splits a half with lower performance into halves. For example, recursively splitting the list is illustrated in FIG. 4. As illustrated in FIG. 4, in list 400, the values of the performance metric are ranked from best performance (e.g., lowest loss value or highest accuracy value) on the top to worst performance (e.g., the highest loss value or lowest accuracy value) on the bottom. In a process of recursively splitting the list, list 400 is split into halves including top half 1 410 and bottom half 1 420, where top half 1 410 is with higher performance (e.g., the lower loss values or higher accuracy values) and bottom half 1 420 is with lower performance (e.g., the higher loss values or lower accuracy values). Bottom half 1 420 is split into halves including top half 2 430 and bottom half 2 440, where top half 2 430 is with higher performance and bottom half 2 440 is with lower performance. Bottom half 2 440 is split into halves including top half 3 450 and bottom half 3 460, where top half 3 450 is with higher performance and bottom half 3 460 is with lower performance. Bottom half 3 460 is split into halves including top half 4 470 and bottom half 4 480, where top half 4 470 is with higher performance and bottom half 4 480 is with lower performance. The process of recursively splitting the list may continue by splitting bottom half 4 480, unless top half 4 470 and bottom half 4 480 are not statistically different.

Referring back to FIG. 3, at step 302, the aggregator computes a mean of the values of the performance metric for each of the halves. At step 303, the aggregator compares means for the halves, using a statistical metric. For example, a T-test is used as the statistical metric. At step 304, the aggregator determines whether the halves are statistically different. For example, using a T-test, the aggregator determines whether there is statistical difference between the means for the halves.

In response to determining that the halves are statistically different (YES branch of decision block 305), at step 306, the aggregator continues recursive splitting and will iterates from step 301 to step 305. In the example illustrated in FIG. 4, if top half 4 470 and bottom half 4 480 are statistically different, bottom half 4 480 will be further split.

In response to determining that the halves are not statistically different (NO branch of decision block 305), at step 307, the aggregator identifies updates corresponding to the values of the performance metric in current halves as the adversary updates. Thus, one or more parties that send the adversary updates can be identified. In the example illustrated in FIG. 4, if top half 4 470 and bottom half 4 480 are not statistically different, updates corresponding to the performance metric values included in both top half 4 470 and bottom half 4 480 are identified as the adversary updates. Then, step 207 in FIG. 2 will be executed to exclude the one or more parties that send the adversary updates from participating in the current round of training in the federated learning.

Essentially, the recursive algorithm in the present invention continues to split a group of updates in half and compares average performance of each of halves. In response to determining that the top half has performance statistically higher than the bottom half, the aggregator determines that updates included in the top half are mostly/entirely honest and updates included in the bottom half are mostly/entirely adversarial; the aggregator continues to split the bottom half with mostly/entirely adversarial updates.

In response to determining that the performance of the two halves is not statistically different, the aggregator stops splitting. The aggregator determines that both halves are now mostly/entirely adversarial and they are pruned because their performances are similarly poor. In other words, under the condition that the performance matric values of the two halves are not statistically different, all updates included in both halves will be rejected or pruned because all updates in both halves are considered as adversarial updates. However, one or more updates in both halves, more particularly the top half, may not be adversarial.

Figure 5A:
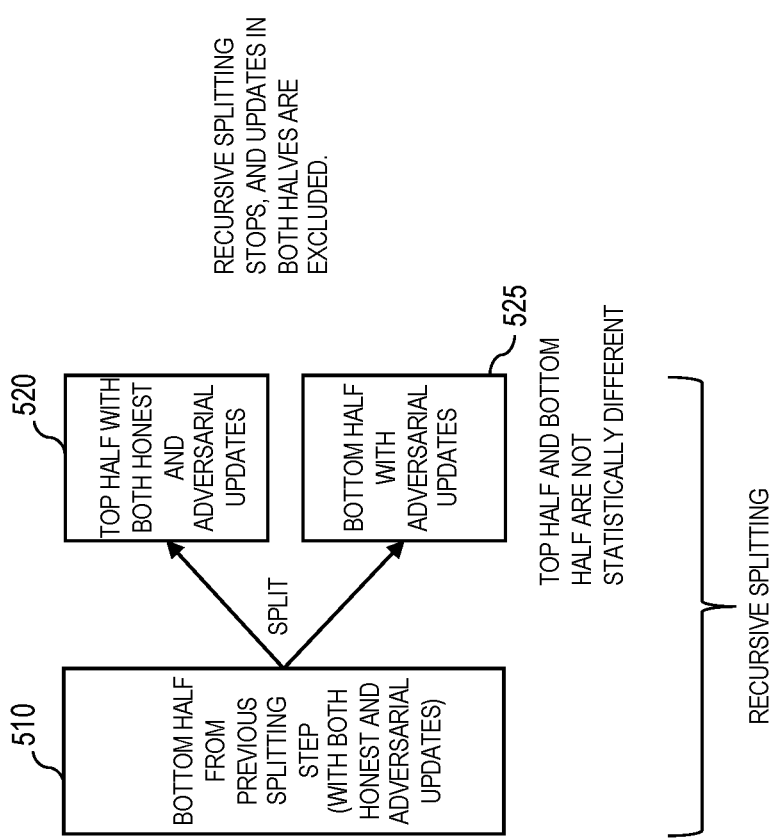
FIG. 5(A) illustrates no backtracking in recursively splitting a list ranking values of a performance metric, in accordance with one embodiment of the present invention.

FIG. 5(A) illustrates no backtracking in recursively splitting a list ranking values of a performance metric, in accordance with one embodiment of the present invention. As shown in FIG. 5(A), in a recursive splitting process, bottom half 510 from a previous splitting step includes both honest and adversarial updates, and it is split into top half 520 (which is with both honest and adversarial updates) and bottom half 525 (which is with adversarial updates only). Top half 520 and bottom half 525 are not statistically different; therefore, the recursive splitting is stopped. All updates in top half 520 and bottom half 525 are rejected or pruned. Without backtracking, honest updates included in top half 520 are undesirably rejected.

For example, starting with 32 updates, since the method described in FIG. 3 splits in half every time, the method will only prune 16, 8, 4, 2, or 1 update at a time. In a scenario where 15 out of 32 updates are adversarial, the method splits the 32 updates into two halves with 16 updates each, and it is determined that the bottom half has statistically worse performance than the top half, because 15 out of 16 updates in the bottom half are adversarial whereas all 16 in the top half are honest. Then, the method splits the bottom 16 into two halves with 8 updates in each, and average performances of the two halves may not be statistically different because the top half may have 7 adversarial updates out of 8 updates and the bottom may have 8 adversarial updates out of 8 updates. Because of no statistical deference, the method stops here, combines the two halves of 8 updates each, and rejects all 16 updates in the halves. In this way, the method does not exactly isolate the adversarial updates and end up rejecting a honest update.

To avoid rejecting any honest update, backtracking may be introduced in the method. With backtracking, the recursive splitting process goes back to the top half of the two halves each with 8 updates and restarts the recursive splitting process with this top half. Now, the top half has 3 adversarial updates out of 4 updates, and the bottom half has 4 adversarial updates out of 4 updates.

Under a condition that the average performances of two halves each with 4 updates are not statistically different, instead of rejecting all 8 updates in these two halves, the method backtracks and restarts the recursive splitting process with the top half of the two halves each with 4 updates. Now, after backtracking and splitting, there is 1 adversarial update out of 2 updates in the top half, and there are 2 adversarial updates out of 2 updates in the bottom half.

Under a condition that the average performances of two halves each with 2 updates are not statistically different, instead of rejecting all 4 updates, the method backtracks again and restarts the recursive splitting process with the top half of the two halves each with 2 updates. Now, after backtracking and splitting, there is only one honest update in the top half and there is only one adversarial update in the bottom half. Therefore, the average performances of two halves each with 1 update should be statistically different. Thus, the method obtains an exact point within the ranking of the performance metric values, and the point separates the honest updates and adversarial updates.

Figure 5B:
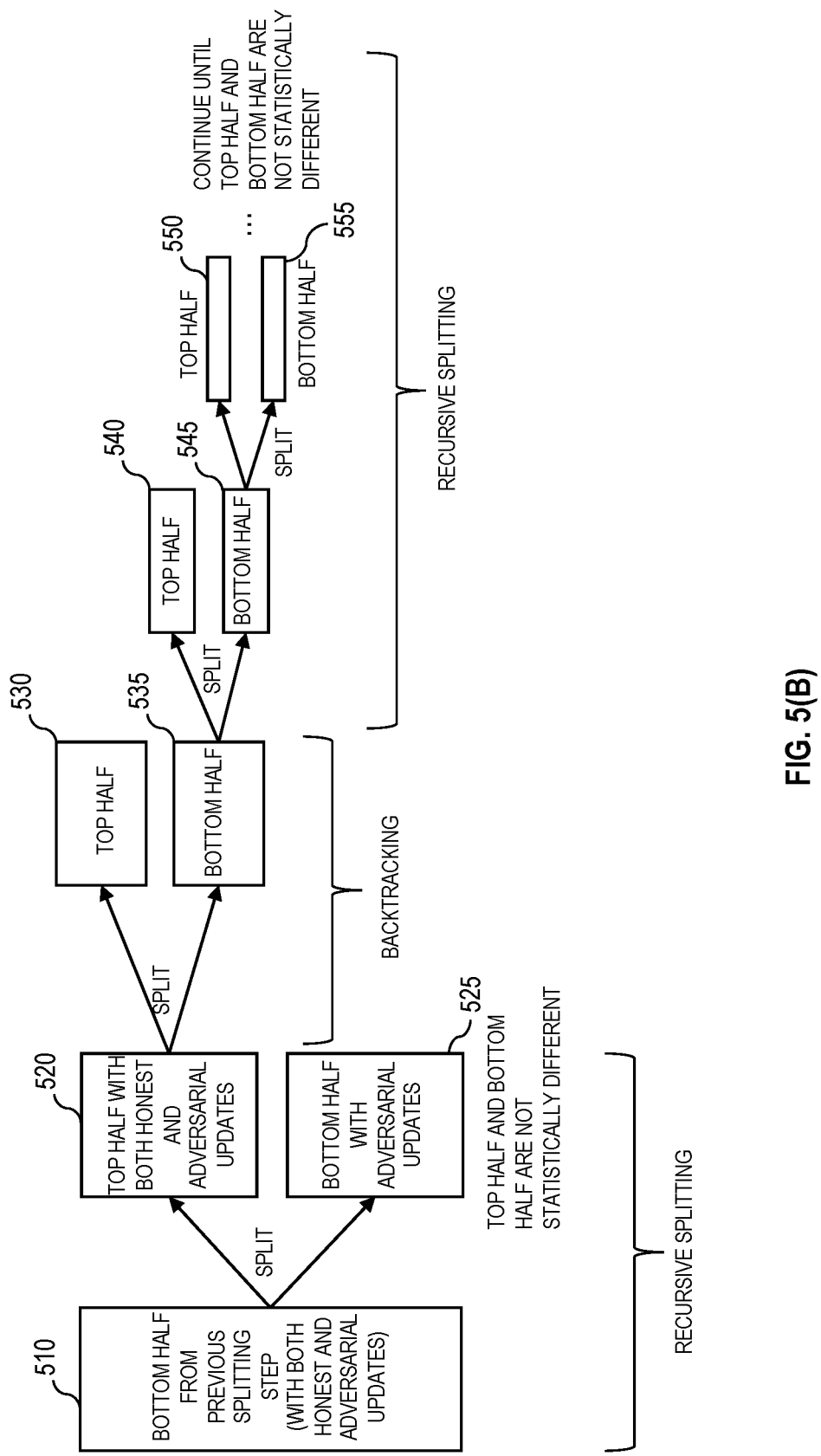
FIG. 5(B) illustrates backtracking at one recursive call in recursively splitting a list ranking values of a performance metric, in accordance with one embodiment of the present invention.

FIG. 5(B) illustrates backtracking at one recursive call in recursively splitting a list ranking values of the performance metric, in accordance with one embodiment of the present invention. Bottom half 510 from a previous splitting step (which include both honest updates and adversarial updates) is split into top half 520 (which is with both honest updates and adversarial updates) and bottom half 525 (which is with adversarial updates only). Top half 520 and bottom half 525 are not statistically different. Without backtracking as shown in FIG. 5(A), the recursively splitting process will stop, and all updates included in top half 520 and bottom half 525 will be rejected; honest updates included in top half 520 are undesirably rejected. To avoid rejecting any honest update top half 520, backtracking is introduced to split top half 520. Through backtracking, top half 520 is split into two halves or two partitions: top half 530 and bottom 535. Under a condition that the average performance of top half 530 and the average performance of top half 535 are statistically different, the recursive splitting is performed. Bottom half 535 is split into two halves or two partitions: top half 540 and bottom half 545. Next, under a condition that average performance of top half 540 and the average performance of top half 545 are statistically different, bottom half 545 is split into two halves or two partitions: top half 550 and bottom 555; the recursive splitting process may continue until the tow partitions are not statistically different.

Figure 5C:
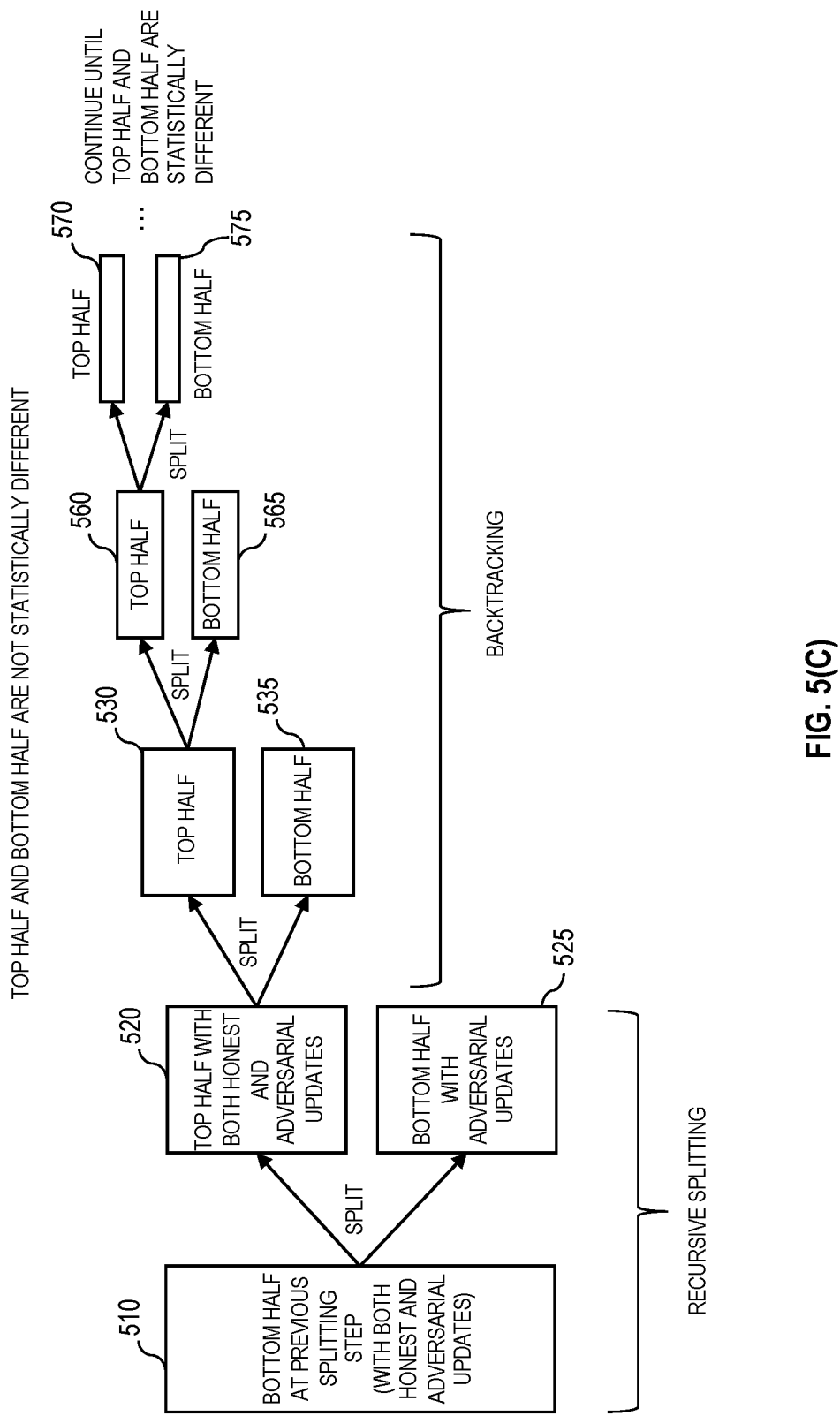
FIG. 5(C) illustrates backtracking at every recursive call in recursively splitting a list ranking values of a performance metric, in accordance with one embodiment of the present invention.

FIG. 5(C) illustrates backtracking at every recursive call in recursively splitting a list ranking values of a performance metric, in accordance with one embodiment of the present invention. Bottom half 510 from a previous splitting step (which include both honest and adversarial updates) is split into top half 520 (which is with both honest and adversarial updates) and bottom half 525 (which is with adversarial updates only). Top half 520 and bottom half 525 are not statistically different; therefore, the recursively splitting process may stop, and all updates, including honest updates, in top half 520 and bottom half 525 are rejected. To avoid rejecting any honest update in top half 520, backtracking is introduced. Through backtracking, top half 520 is split into two halves or two partitions: top half 530 and bottom 535. By comparing the average performance of updates in top half 530 and the average performance of updates in bottom half 535, it is found that top half 530 and bottom 535 are not statistically different; therefore, further backtracking is performed. In further backtracking, top half 530 is split into two halves or two partitions: top half 560 and bottom 565. The average performance of updates in top half 560 and the average performance of updates in bottom half 565 are compared, and it is found that top half 560 and bottom 565 are not statistically different. Because of no statistical difference, top half 560 is split into two halves or two partitions: top half 570 and bottom 575. Then, the average performance of updates in top half 570 and the average performance of updates in bottom half 575 will be compared. Backtracking will be continued, until a point separating the honest updates and adversarial updates is found within the ranking of the performance metric values.

Figure 6:
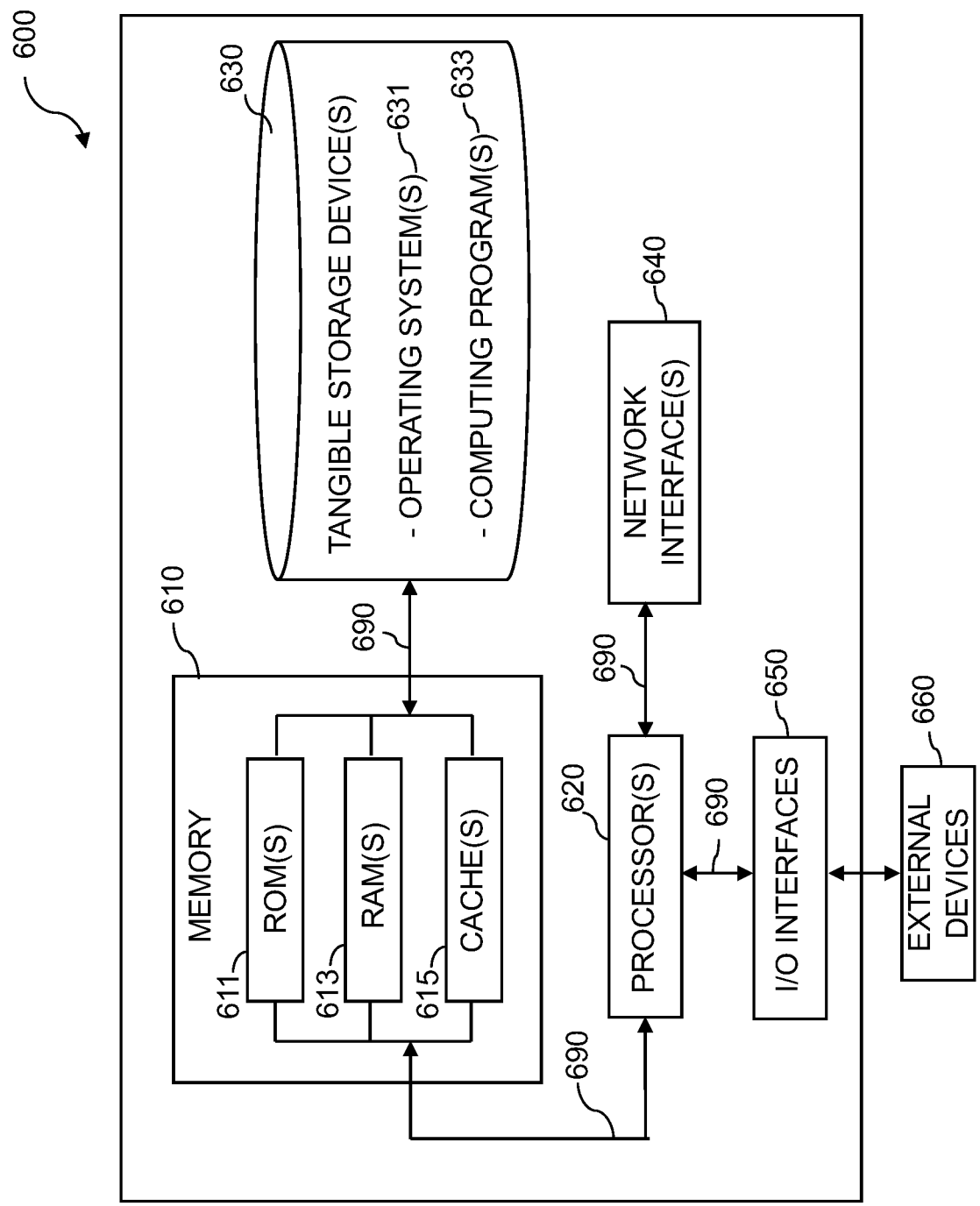
FIG. 6 is a diagram illustrating components of a computing device or server, in accordance with one embodiment of the present invention.

FIG. 6 is a diagram illustrating components of computing device or server 600, in accordance with one embodiment of the present invention. It should be appreciated that FIG. 6 provides only an illustration of one implementation and does not imply any limitations; different embodiments may be implemented.

Referring to FIG. 6, computing device or server 600 includes processor(s) 620, memory 610, and tangible storage device(s) 630. In FIG. 6, communications among the above-mentioned components of computing device or server 600 are denoted by numeral 690. Memory 610 includes ROM(s) (Read Only Memory) 611, RAM(s) (Random Access Memory) 616, and cache(s) 615. One or more operating systems 631 and one or more computer programs 633 reside on one or more computer readable tangible storage device(s) 630.

Computing device or server 600 further includes I/O interface(s) 650. I/O interface(s) 650 allows for input and output of data with external device(s) 660 that may be connected to computing device or server 600. Computing device or server 600 further includes network interface(s) 640 for communications between computing device or server 600 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
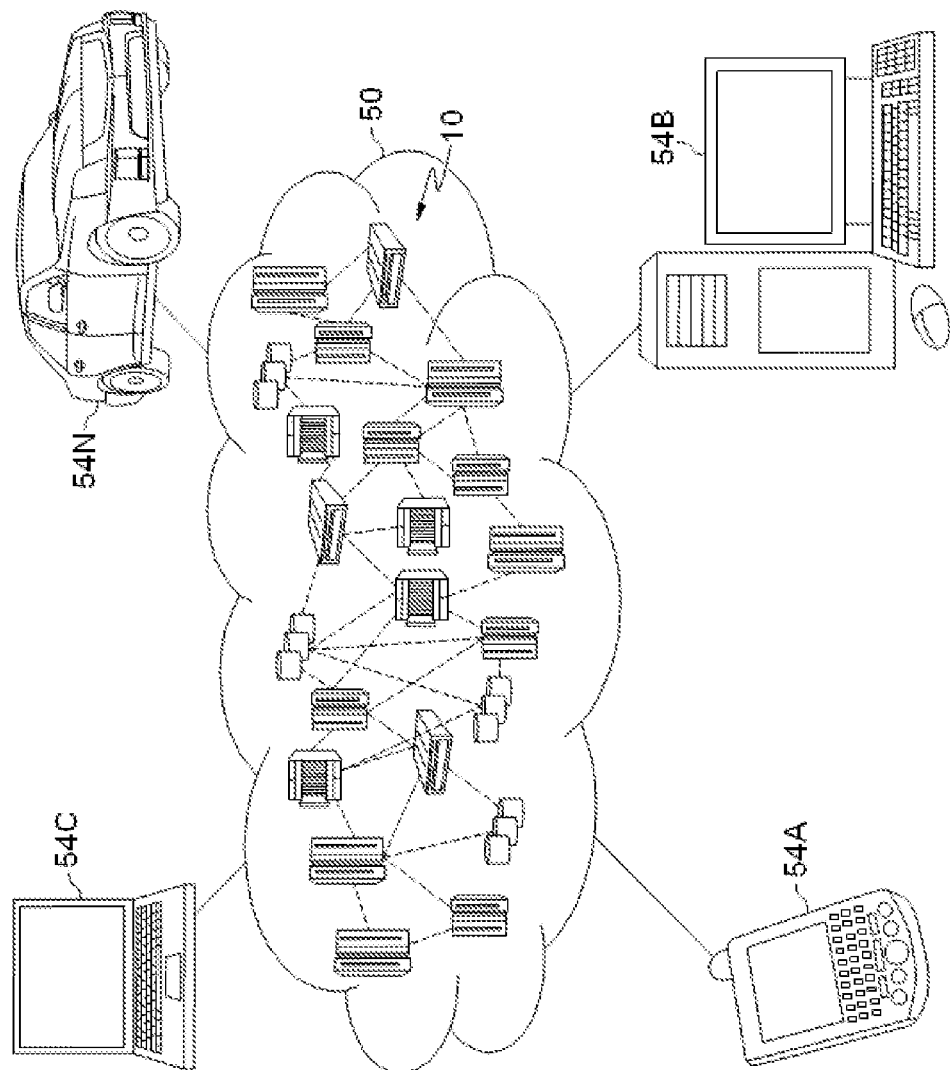
FIG. 7 depicts a cloud computing environment, in accordance with one embodiment of the present invention.

Referring now to FIG. 7, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 8:
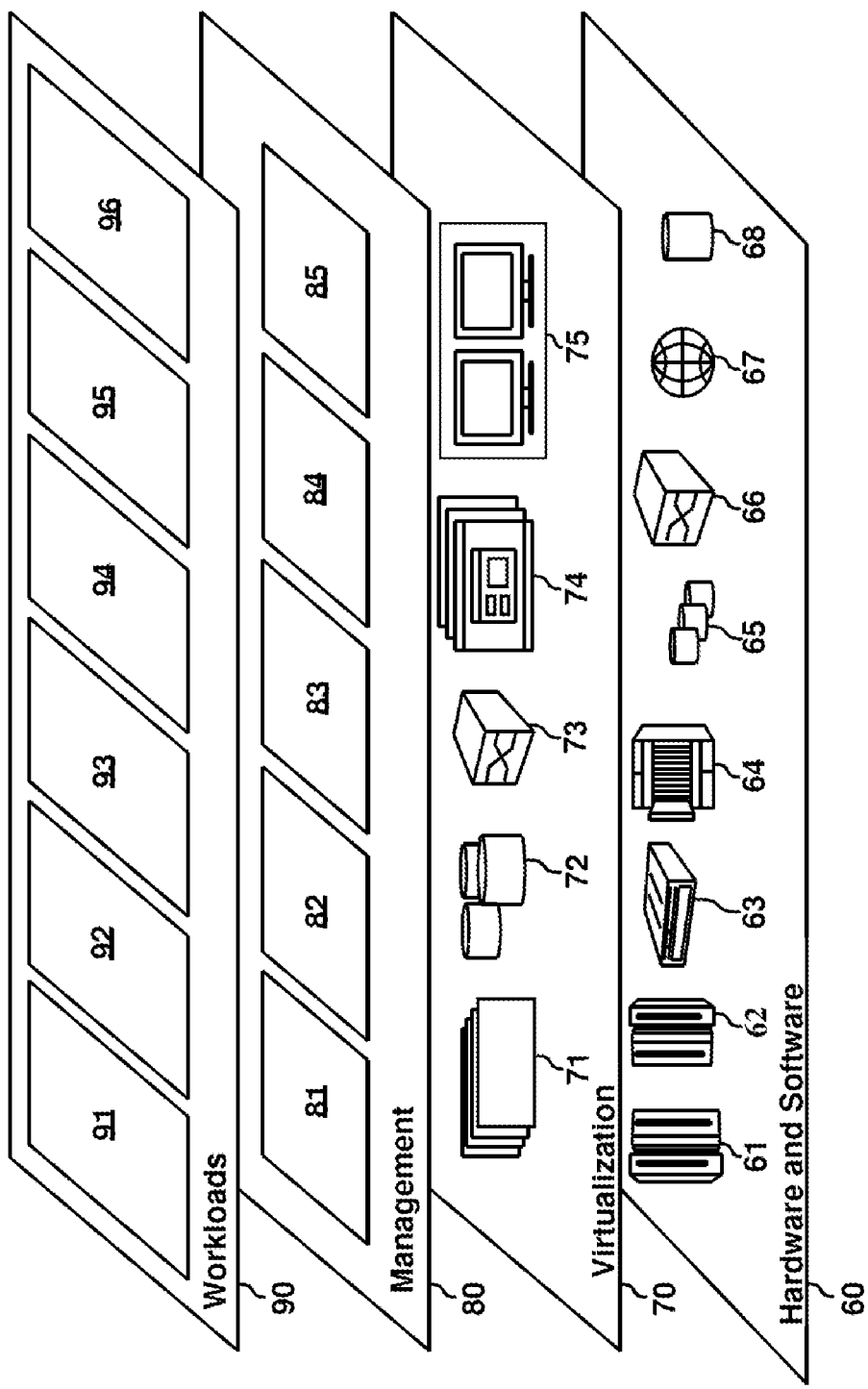
FIG. 8 depicts abstraction model layers in a cloud computing environment, in accordance with one embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of defending against adversarial attacks in federated learning.

What is claimed is:

1. A computer-implemented method for defending against adversarial attacks in federated learning, the method comprising:
  receiving, by an aggregator in the federated learning, weights sent from respective parties in the federated learning;
  computing, by the aggregator, values of a performance metric for weight arrays obtained by the respective parties, using a validation dataset;
  ranking, by the aggregator, the values of the performance metric in a list;
  recursively splitting, by the aggregator, the list in half, and respective bottom halves thereafter, until one or more adversary updates of the weights are isolated by identifying two halves that are not statistically different and do have a difference in performance;
  performing recursive splitting on a top half with higher performance of the two halves that are not statistically different until an honest update in the top half is isolated; and
  excluding, by the aggregator, one or more parties that send the one or more adversary updates from participating in a current round of training in the federated learning, wherein the one or more adversary updates are a bottom half of the two halves that are not statistically different and the top half with the honest update excluded.

2. The computer-implemented method of claim 1, further comprising:
  averaging, by the aggregator, the weight arrays obtained by respective remaining parties, to update a global model in the federated learning.

3. The computer-implemented method of claim 1, for recursively splitting the list, further comprising:
  recursively splitting, by the aggregator, a half with lower performance into halves;
  computing, by the aggregator, a mean of the values of the performance metric for each of the halves;
  comparing, by the aggregator, means for the halves, using a statistical metric;
  determining, by the aggregator, whether the halves are statistically different; and
  in response to determining that the halves are statistically different, continuing, by the aggregator, recursive splitting.

4. The computer-implemented method of claim 3, further comprising:
  in response to determining that the halves are not statistically different, stopping, by the aggregator, the recursive splitting; and
  identifying, by the aggregator, updates corresponding to current halves as the adversary updates.

5. The computer-implemented method of claim 3, further comprising:
  in response to determining that the halves are not statistically different, starting, by the aggregator, backtracking to recursively split a half with higher performance into two partitions;
  computing, by the aggregator, a mean of the values of the performance metric for each of the two partitions;
  comparing, by the aggregator, means for the two partitions, using the statistical metric;
  determining, by the aggregator, whether the two partitions are statistically different;
  in response to determining that the two partitions are not statistically different, continuing, by the aggregator, the backtracking, until a point separating honest updates and the one or more adversarial updates is found; and
  in response to determining that the two partitions are statistically different, recursively splitting, by the aggregator, a partition with lower performance.

6. A computer program product for defending against adversarial attacks in federated learning, the computer program product comprising a computer readable storage medium having program instructions embodied therewith, the program instructions executable by one or more processors, the program instructions executable to:
  receive, by an aggregator in the federated learning, weights sent from respective parties in the federated learning;
  compute, by the aggregator, values of a performance metric for weight arrays obtained by the respective parties, using a validation dataset;
  rank, by the aggregator, the values of the performance metric in a list;
  recursively split, by the aggregator, the list in half, and respective bottom halves thereafter, until one or more adversary updates of the weights are isolated by identifying two halves that are not statistically different and do have a difference in performance;
  perform recursive splitting on a top half with higher performance of the two halves that are not statistically different until an honest update in the top half is isolated; and exclude, by the aggregator, one or more parties that send the one or more adversary updates from participating in a current round of training in the federated learning, wherein the one or more adversary updates are a bottom half of the two halves that are not statistically different and the top half with the honest update excluded.

7. The computer program product of claim 6, further comprising the program instructions executable to:
average, by the aggregator, the weight arrays obtained by respective remaining parties, to update a global model in the federated learning.

8. The computer program product of claim 6, for recursively splitting the list, further comprising the program instructions executable to:
recursively split, by the aggregator, a half with lower performance into halves;
compute, by the aggregator, a mean of the values of the performance metric for each of the halves;
compare, by the aggregator, means for the halves, using a statistical metric;
determine, by the aggregator, whether the halves are statistically different; and
in response to determining that the halves are statistically different, continue, by the aggregator, recursive splitting.

9. The computer program product of claim 8, further comprising the program instructions executable to:
in response to determining that the halves are not statistically different, stop, by the aggregator, the recursive splitting; and
identify, by the aggregator, updates corresponding to current halves as the adversary updates.

10. The computer program product of claim 8, further comprising program instructions executable to:
in response to determining that the halves are not statistically different, start, by the aggregator, backtracking to recursively split a half with higher performance into two partitions;
compute, by the aggregator, a mean of the values of the performance metric for each of the two partitions;
compare, by the aggregator, means for the two partitions, using the statistical metric;
determine, by the aggregator, whether the two partitions are statistically different;
in response to determining that the two partitions are not statistically different, continue, by the aggregator, the backtracking, until a point separating honest updates and the one or more adversarial updates is found; and
in response to determining that the two partitions are statistically different, recursively split, by the aggregator, a partition with lower performance.

11. A computer system for defending against adversarial attacks in federated learning, the computer system comprising one or more processors, one or more computer readable tangible storage devices, and program instructions stored on at least one of the one or more computer readable tangible storage devices for execution by at least one of the one or more processors, the program instructions executable to:
receive, by an aggregator in the federated learning, weights sent from respective parties in the federated learning;
compute, by the aggregator, values of a performance metric for weight arrays obtained by the respective parties, using a validation dataset;
rank, by the aggregator, the values of the performance metric in a list;
recursively split, by the aggregator, the list in half, and respective bottom halves thereafter, until one or more adversary updates of the weights are isolated by identifying two halves that are not statistically different and do have a difference in performance;
perform recursive splitting on a top half with higher performance of the two halves that are not statistically different until an honest update in the top half is isolated; and
exclude, by the aggregator, one or more parties that send the one or more adversary updates from participating in a current round of training in the federated learning, wherein the one or more adversary updates are a bottom half of the two halves that are not statistically different and the top half with the honest update excluded.

12. The computer system of claim 11, further comprising the program instructions executable to:
average, by the aggregator, the weight arrays obtained by respective remaining parties, to update a global model in the federated learning.

13. The computer system of claim 11, for recursively splitting the list, further comprising the program instructions executable to:
recursively split, by the aggregator, a half with lower performance into halves;
compute, by the aggregator, a mean of the values of the performance metric for each of the halves;
compare, by the aggregator, means for the halves, using a statistical metric;
determine, by the aggregator, whether the halves are statistically different; and
in response to determining that the halves are statistically different, continue, by the aggregator, recursive splitting.

14. The computer system of claim 13, further comprising the program instructions executable to:
in response to determining that the halves are not statistically different, stop, by the aggregator, the recursive splitting; and
identify, by the aggregator, updates corresponding to current halves as the adversary updates.

15. The computer system of claim 13, further comprising program instructions executable to:
in response to determining that the halves are not statistically different, starting, by the aggregator, backtracking to recursively split a half with higher performance into two partitions;
compute, by the aggregator, a mean of the values of the performance metric for each of the two partitions;
compare, by the aggregator, means for the two partitions, using the statistical metric;
determine, by the aggregator, whether the two partitions are statistically different;
in response to determining that the two partitions are not statistically different, continue, by the aggregator, the backtracking, until a point separating honest updates and the one or more adversarial updates is found; and
in response to determining that the two partitions are statistically different, recursively split, by the aggregator, a partition with lower performance.

16. A computer-implemented method for defending against adversarial attacks in federated learning, the method comprising:
receiving, by an aggregator in the federated learning, weights sent from respective parties in the federated learning;

computing, by the aggregator, values of loss for weight arrays obtained by the respective parties, using a validation dataset;

ranking, by the aggregator, the values of the loss in a list;

recursively splitting, by the aggregator, the list in half, and respective bottom halves thereafter, until one or more adversary updates of the weights are isolated by identifying two halves that are not statistically different and do have a difference in performance;

performing recursive splitting on a top half with higher performance of the two halves that are not statistically different until an honest update in the top half is isolated; and excluding, by the aggregator, one or more parties that send the one or more adversary updates from participating in a current round of training in the federated learning, wherein the one or more adversary updates are a bottom half of the two halves that are not statistically different and the top half with the honest update excluded.

17. The computer-implemented method of claim 16, further comprising:

averaging, by the aggregator, the weight arrays obtained by respective remaining parties, to update a global model in the federated learning.

18. The computer-implemented method of claim 16, for recursively splitting the list, further comprising:

recursively split, by the aggregator, a half with higher loss values into halves;

computing, by the aggregator, a mean of the values of the loss for each of the halves;

comparing, by the aggregator, means for the halves, using a t-test;

determining, by the aggregator, whether the halves are statistically different; and in response to determining that the halves are statistically different, continuing, by the aggregator, recursive splitting.

19. The computer-implemented method of claim 18, further comprising:

in response to determining that the halves are not statistically different, stopping, by the aggregator, the recursive splitting; and identifying, by the aggregator, updates corresponding to current halves as the adversary updates.

20. The computer-implemented method of claim 18, further comprising:

in response to determining that the halves are not statistically different, starting, by the aggregator, backtracking to recursively split a half with lower loss values into two partitions;

computing, by the aggregator, a mean of the values of the loss for each of the two partitions;

comparing, by the aggregator, means for the two partitions, using the t-test;

determining, by the aggregator, whether the two partitions are statistically different;

in response to determining that the two partitions are not statistically different, continuing, by the aggregator, the backtracking, until a point separating honest updates and the one or more adversarial updates is found; and in response to determining that the two partitions are statistically different, recursively splitting, by the aggregator, a partition with higher loss values.

21. A computer-implemented method for defending against adversarial attacks in federated learning, the method comprising:

receiving, by an aggregator in the federated learning, weights sent from respective parties in the federated learning;

computing, by the aggregator, values of accuracy for weight arrays obtained by the respective parties, using a validation dataset;

ranking, by the aggregator, the values of the accuracy in a list;

recursively splitting, by the aggregator, the list in half, and respective bottom halves thereafter, until one or more adversary updates of the weights are isolated by identifying two halves that are not statistically different and do have a difference in performance;

performing recursive splitting on a top half with higher performance of the two halves that are not statistically different until an honest update in the top half is isolated; and excluding, by the aggregator, one or more parties that send the one or more adversary updates from participating in a current round of training in the federated learning, wherein the one or more adversary updates are a bottom half of the two halves that are not statistically different and the top half with the honest update excluded.

22. The computer-implemented method of claim 21, further comprising:

averaging, by the aggregator, the weight arrays obtained by respective remaining parties, to update a global model in the federated learning.

23. The computer-implemented method of claim 21, for recursively splitting the list, further comprising:

recursively split, by the aggregator, a half with lower accuracy values into halves;

computing, by the aggregator, a mean of the values of the accuracy for each of the halves;

comparing, by the aggregator, means for the halves, using a t-test;

determining, by the aggregator, whether the halves are statistically different; and in response to determining that the halves are statistically different, continuing, by the aggregator, recursive splitting.

24. The computer-implemented method of claim 23, further comprising:

in response to determining that the halves are not statistically different, stopping, by the aggregator, the recursive splitting; and identifying, by the aggregator, updates corresponding to current halves as the adversary updates.

25. The computer-implemented method of claim 23, further comprising:

in response to determining that the halves are not statistically different, starting, by the aggregator, backtracking to recursively split a half with higher accuracy values into two partitions;

computing, by the aggregator, a mean of the values of the accuracy for each of the two partitions;

comparing, by the aggregator, means for the two partitions, using the t-test;

determining, by the aggregator, whether the two partitions are statistically different;

in response to determining that the two partitions are not statistically different, continuing, by the aggregator, the backtracking, until a point separating honest updates and the one or more adversarial updates is found; and in response to determining that the two partitions are statistically different, recursively splitting, by the aggregator, a partition with lower accuracy values.

\* \* \* \* \*